(12) United States Patent
Jaeger

(10) Patent No.: US 7,574,664 B2
(45) Date of Patent: Aug. 11, 2009

(54) METHODS FOR RECURSIVE SPACING AND TOUCH TRANSPARENCY OF ONSCREEN OBJECTS

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 973 days.

(21) Appl. No.: 10/671,950

(22) Filed: Sep. 26, 2003

(65) Prior Publication Data

US 2004/0056875 A1 Mar. 25, 2004

Related U.S. Application Data

(63) Continuation-in-part of application No. 10/635,704, filed on Aug. 5, 2003, now Pat. No. 7,254,787, which is a continuation-in-part of application No. 10/054,277, filed on Jan. 24, 2002, now abandoned, which is a continuation of application No. 09/880,397, filed on Jun. 12, 2001, now Pat. No. 6,883,145, which is a continuation-in-part of application No. 09/785,049, filed on Feb. 15, 2001, now abandoned.

(51) Int. Cl.
*G06F 3/00* (2006.01)
(52) U.S. Cl. .................... 715/764; 715/788; 715/810; 715/201; 715/235; 345/157; 345/173; 345/179
(58) Field of Classification Search ................ 715/201, 715/235, 764, 788, 810; 345/157, 173, 179
See application file for complete search history.

(56) References Cited

U.S. PATENT DOCUMENTS

| 5,630,080 | A | * | 5/1997 | Malamud et al. ............ 715/769 |
| 5,666,139 | A | * | 9/1997 | Thielens et al. ............ 345/173 |
| 5,678,039 | A | * | 10/1997 | Hinks et al. .................... 707/4 |
| 6,021,218 | A | * | 2/2000 | Capps et al. ................. 382/187 |
| 6,032,163 | A | * | 2/2000 | Tou et al. ..................... 715/235 |
| 6,466,954 | B1 | * | 10/2002 | Kurosawa et al. ........... 715/209 |
| 6,626,960 | B1 | * | 9/2003 | Gillam ....................... 715/201 |
| 6,751,780 | B1 | * | 6/2004 | Neff et al. ................... 715/247 |
| 2002/0097270 | A1 | * | 7/2002 | Keely et al. ................. 345/764 |

* cited by examiner

*Primary Examiner*—Tadesse Hailu
*Assistant Examiner*—Michael Roswell
(74) *Attorney, Agent, or Firm*—Harris Zimmerman; Howard Cohen

(57) ABSTRACT

The invention generally comprises methods for spacing a plurality of onscreen objects on the display of a computer or similar electronic device. One aspect is the Ripple operation, in which onscreen objects may be repositioned recursively in Blackspace or within a VDACC to accommodate changes in the size or position of an object, or the introduction of an object into a group of objects. Another aspect is the Text Space operation which enables a user to drag and reposition text without regard to rigid rules regarding margins, line spacing, paragraph format, and the like. A further aspect Touch Transparency, a software routine that determines which overlying object is designated to receive a mouse click and respond thereto.

5 Claims, 8 Drawing Sheets

METHODS FOR RECURSIVE SPACING AND TOUCH TRANSPARENCY OF ONSCREEN OBJECTS

CROSS-REFERENCE TO RELATED APPLICATIONS

This application is a continuation-in-part of U.S. patent application Ser. No. 10/635,704, filed Aug. 5, 2003, now U.S. Pat. No. 7,254,787 which is a continuation-in-part of application Ser. No. 10/054,277, filed Jan. 24, 2002, now abandoned which is a continuation of U.S. patent application Ser. No. 09/880,397, filed Jun. 12, 2001, now U.S. Pat. No. 6,883,145 which is a continuation-in-part of U.S. patent application Ser. No. 09/785,049, filed Feb. 15, 2001, now abandoned for which priority is claimed. The entireties of the prior applications are incorporated herein by reference.

FEDERALLY SPONSORED RESEARCH

Not applicable.

SEQUENCE LISTING, ETC ON CD

Not applicable.

BACKGROUND OF THE INVENTION

1. Field of the Invention

This invention relates to the arrangement of onscreen objects in a computer system having a display and means for a user to manipulate the onscreen objects and, more particularly, to methods for spacing onscreen objects with respect to each other and to text objects. It further relates to methods for adjusting the spacing of text within a text object, including non-linear line spacing and paragraph movement within documents. The invention also relates to a method for establishing touch transparency of onscreen objects with respect to other objects that are overlying or underlying.

2. Description of Related Art

Modem word processing approaches have evolved from traditional text concepts, such as line width (or page width minus left and right margins), line height (generally expressed as font size in points) and line spacing (generally expressed as single, double or triple line spacing). In virtually all word processing programs these parameters control the presentation of text, and this approach has sufficed for many uses. Line spacing in the vertical direction is thus limited to individual settings of font size and line spacing intervals. When graphic objects (such as graphics, photos, formulae, and the like) are introduced into a text field, some word processing programs react by defining an object space that is equal to an integer multiple of the line spacing set for the text field. This spacing may be awkward or inapt, given that the preset line spacing may not permit balanced spacing above and below the object, or may be too great or too small in proportion to the object size. Text wrap functions are present in some applications that allow a lateral spacing effect in which the text lines approach to within a minimum preset lateral distance to the graphic object.

However, the advent of page layout systems, graphic programs, and the like have complicated the task of spacing objects onscreen. Some graphic programs enable spacing objects by selecting them and activating a spacing function that creates equal spacing of the objects, in either Cartesian direction. These functions generally do not work well, or at all, with mixed text objects and graphic objects, nor do they enable spacing a graphic object among the lines of a text object. Nor are these applications capable of respacing a collection of graphic objects when one of them is resized or moved, without first reselecting the group and commanding a new spacing routine. Nor are they capable of respacing lines of text when an interposed graphic object is resized. Thus the prior art software applications are limited in their functions and usefulness.

Another problematic aspect of graphics application involves multiple onscreen objects and more specifically a situation in which multiple objects are positioned and depicted one atop the other. The general rule is that the object currently occupying the uppermost layer (virtual vertical position) in the depiction is available to be selected and moved or otherwise activated by positioning the cursor and clicking on the topmost object. However, it is often the case that the user may wish to select an onscreen object below the topmost object, and can visualize the desired object in the depiction, yet cannot select it because of the presence of a superjacent object. Generally, there is no way to provide "touch transparency" in prior art graphics programs ("touch transparency") being defined herein as the ability of an onscreen object in a vertical arrangement of multiple objects to transfer any mouse click thereon to an onscreen object below it (subjacent in the vertical order of the multiple objects). Rather, the user must adjust the layering of objects and groupings of objects, using UP/DOWN commands in a pulldown menu or manipulating the numerical order of the vertical arrangement. These techniques are awkward and time-consuming, making it difficult to establish the vertical ordering that yields the desired depiction and desired selection.

BRIEF SUMMARY OF THE INVENTION

The present invention generally comprises methods for spacing a plurality of onscreen objects on the display of a computer or similar electronic device. The methods include graphic objects, graphic objects intermixed with text objects, as well as spacing of lines and paragraphs within text objects.

In one aspect, the invention introduces the Ripple operation, in which onscreen objects may be repositioned in Blackspace or within a VDACC to accommodate changes in the size or position of an object, or the introduction of an object into a group of objects. The Ripple operation is a recursive procedure that accounts for complex objects, such as text objects or grouped objects, that incorporate internal spaces, and thus is not limited to dealing merely with the external overall bounding rectangles of objects.

In another aspect, the invention introduces a Text Space operation which enables a user to reposition text without regard to rigid rules regarding margins, line spacing, paragraph format, and the like that are commonly used in prior art word processing programs. Text Space mode permits individual lines, or paragraphs, or selected text portions to be dragged and repositioned to achieve a desired text arrangement, and provides flexibility and freedom of movement of text that is unknown in prior art word processing applications.

A further aspect of the invention is the introduction of Touch Transparency, a software routine that determines the onscreen objects that are present at the position of a mouse click, and which of these objects is designated to receive the mouse click and respond thereto. (A mouse click comprises pressing a mouse button with the mouse cursor at an intended onscreen location, and may also generally include the equivalent touch screen tap or the like.)

DETAILED DESCRIPTION OF THE INVENTION

Figure 1:
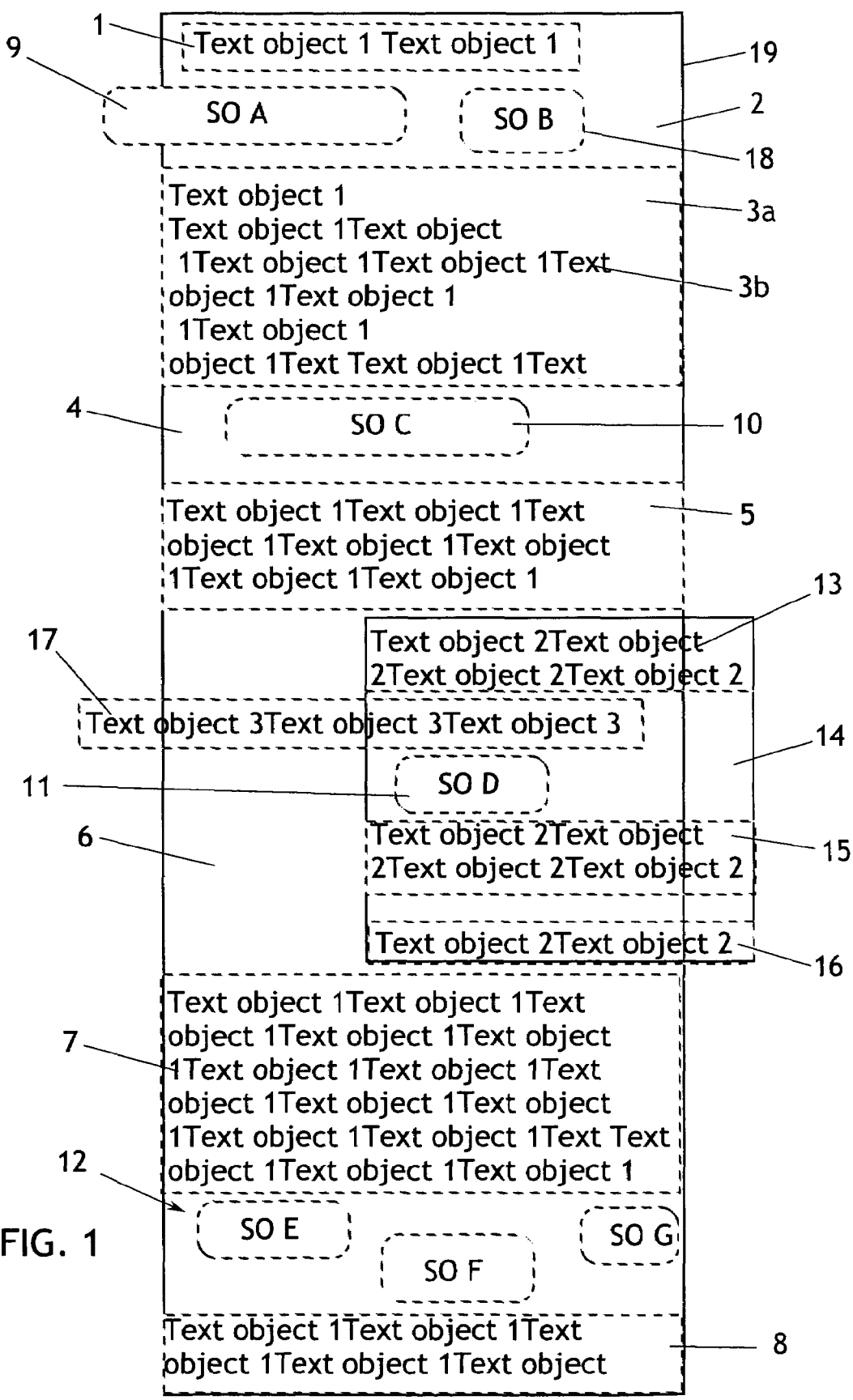
FIG. 1 is an example of spacing tasks involving mixed graphic objects and text objects that are carried out by the Allow Ripple function of the present invention.

The present invention generally comprises a method for depicting onscreen objects and, more particularly, to a method for altering the spacing of onscreen objects as they are moved, resized, or added or removed from a depiction.

The following terms used herein are defined as follows:

BLACKSPACE is a trademark of the NBOR Corporation. Blackspace presents a computer working environment having one universal working or drawing surface that is shared by all graphic objects within the environment. Each of these graphic objects can have user-created relationships to any or all of the other objects. Text objects are treated the same as any other graphic object.

VDACC is a trademark of the NBOR Corporation. VDACC is an acronym for Visual (or Virtual) Display and Control Canvas, and denotes a bounded area on a computer display that manages one or more graphic objects that exist on the Blackspace universal working or drawing surface. Graphic objects may be contained within a VDACC, together with the user-created relationships therebetween and with graphic objects outside the VDACC or in another VDACC. The graphic objects and these relationships may be saved and recalled, along with their exact layout, within any VDACC. Any VDACC can accommodate and facilitate any operation that the computer may perform, such as, but not limited to, text processing, graphics processing, audio and video editing and playing, picture display and cropping, and the like.

LAYOUT CHANGE—A change in the onscreen appearance or spacing of one or more graphic objects.

ALLOW RIPPLE—A property of all graphic objects which enables graphic objects to be spaced apart from nearby objects in a recursive manner that accounts for changes in size, number, and location of the objects. Allow Ripple may be set ON or OFF: If set to OFF for a graphic object, that object is excluded from all Ripple operations; If set to ON, the object is included in all Ripple spacing operations within it's ENSEMBLE (see blow)

[RIPPLE] ENSEMBLE—A list of graphic objects for which Ripple actions are to be calculated and applied when one or more objects in the list undergo a change of layout. A graphic object may be in only one ensemble at any one time. An example of a Ripple ensemble is the list of objects with Allow Ripple enabled in a VDACC. An Ensemble can be implemented in any environment, such as a VDACC or in Primary Blackspace.

INTERACTIVE GEOMETRY [IG]—The property or properties of a graphic object which determine(s) its area of screen available for user interaction with it via a pointing or other user input device.

SIMPLE Interactive Geometry (Simple IG)—The IG of a graphic object within the system which is always adequately defined by the bounding rectangle of the object or a single closed polygon enclosing its extent on the screen.

COMPLEX IG—The IG of a graphic object within the system which may include multiple closed polygons within its extent on the screen. Furthermore a complex IG may include other properties which may affect the IG of a graphic object at any time whilst the system is active.

DOMAIN—A graphic object with ALLOW RIPPLE turned ON, which may have, within the system, a COMPLEX IG as described above. A domain will generally have an IG which is comprised of multiple rectangular or polygonal IGs. As such, domains may undergo IG changes which alter the complex IG but do not necessarily alter the simple IG. Furthermore, changes to the IG of a Domain may result from changes to its properties which are not explicitly concerned with it's IG. An example of a DOMAIN is a Text Object.

DOMAIN TO NOTIFY—the domain(s) which contains a graphic object whose layout has been changed. This graphic object must have a complex geometry. For example, when a simple object (e.g. a circle) has changed is geometry within a text object and the text object qualifies as a Domain for the circle, then the text object is a Domain to Notify. Moreover, when the text object just described responds to the circle's geometry change by changing its own geometry, the Domains for the text object which are found, e.g., those objects with complex geometry and that enclose it vertically, become the Domain to Notify for the next iteration of the process.

VILLEIN—A graphic object with ALLOW RIPPLE turned ON which, at the instant of a particular LAYOUT CHANGE is identified at that instant as falling within the influence or 'jurisdiction' (for Auto-layout purposes) of a Domain or Domains (as described above). As such, it does not itself respond autonomously to the LAYOUT CHANGE, geometrically or otherwise, but delegates the determination and implementation of changes to it's properties to the domain or domains as determined (for this change) as described above. Any Graphic Object can at any time be treated as a VILLEIN by the system when evaluating a Layout Change, regardless of whether it is also currently a DOMAIN. From the antiquated definition: in feudal England, any member of a class of serfs, or peasants, who by the thirteenth century had become freemen in their legal relations to all others except their lord, to whom they remained entirely subject as slaves.

The Ripple operation is a method for spacing onscreen objects using a recursive process. There are three aspects to Allow Ripple:

1. Basic Allow Ripple
2. Allow Ripple for a single complex object containing other objects.
3. Allow Ripple for one or more complex objects that intersect other complex objects and that delegates the further detection of intersection objects to another complex text object in a recursive behavior.

Basic Allow Ripple (AR) In basic AR objects are judged by their bounding rectangles and no attention is paid to their internal geometries. One example involves resizing an object and respacing nearby objects to accommodate the change in object size. Noting that an Ensemble is a list of things (objects) which are to be affected by Allow Ripple, if one of these objects is resized then all the remaining objects in the Ensemble will be examined and the decision to apply ripple to each of them will be resolved.

The AR routine first determines which objects in the Ensemble list are included in Allow Ripple (which objects have Allow Ripple turned on). Then it goes through its list of graphic objects and it finds the object that has been resized. The list is organized with the object at the top of the document ("top" denoting the maximum Cartesian Y direction) at the top of the list. Then each object that has been added below the top of this first object is next on the list and simple object on. Ensemble goes down its list and finds the object that has been resized. Then for instance, according to the behavior as described in the flow chart, all objects below the object that has been resized are moved down by the same distance that the object has been resized. If the object has been resized up, then all objects above it are moved up by the distance that the object has been resized. NOTE: only objects that have AR turned on in their menu or Info Canvas will be automatically moved. Objects that do not have AR turned on in their menus or Info Canvases will not be moved.

This operation is done on successive mouse messages. As far as the user is aware, this operation of auto-respacing of objects appears to happen immediately upon the resizing of an object that exists in an Ensemble. Every time the mouse moves, the old size of the object which is being resized is calculated as compared to the new size and this distance is added to the position of all objects that have AR turned on for them and that are either above or below the resized object, depending upon which direction the object is being resized. Note that the Ripple operation happens automatically if Allow Ripple is turned on, unlike prior art spacing routines in which objects must be selected and commanded to be spaced apart on a singular, non-recurring basis. Note also that the Ripple operation functions in the lateral direction (the Cartesian X direction) as well as vertically.

With regard to FIG. 1, the text object 1 is a complex object that consists of various geometries and vertical spaces. For instance, text portions 3, 5, 7 and 8 are all parts of this single complex text object, which may have been separated by entering line returns, or by the use of a staircase spacing tool, as described in copending application Ser. No. 10/635,704, filed Aug. 5, 2003. In between each of these portions are spaces such as 2, 4 6 and 20. In these spaces other objects may be placed, such as object 9 in space 2, object 10 in space 4, multiple objects 13-17 in space 6, and objects 12 in space 20. Such objects could be recognized objects like stars, squares, triangles or the like, or may be drawings, buttons, pictures, etc.

The spaces in text object 1 are the parts that are not enclosed by the dotted lines. The solid line 19 is the external or "simple" geometry boundary of text object 1.

A text object is of a class of objects that are referred to as Domain capable or that have a complex internal geometry. The dotted lines illustrate the internal geometry of text object 1. The dotted lines indicate the sub-geometries which the object maintains within itself—they are part of the object definition of text object 1. Referring to the second sub-geometry of text object 1 (portion 3*a*), if a user places the text cursor at the end of the text line at position 3*b* and then presses the Enter key, a new line will be added to the portion 3*a*. If no text is typed then this will be an added space. If text is typed then this will be an added line. Either way, the height of one line of text is being added to portion 3*a*.

In this particular example everything else would be considered a Villein to the Domain of text object 1. Thus when the user places a text cursor at 3*b* and hits the Enter key or Return key or its equivalent, an analysis is performed. In this example the Domain is text object 1 which includes all of the various portions of the text object and the spaces therebetween. What defines this object as a Domain is the fact that it is capable of having a COMPLEX GEOMETRY. Referring again to this FIGURE, text object 1 has other objects which either intersect it or are enclosed by it.

A Domain is identified by two things:

A. Whether it is capable of a complex internal geometry.

B. Whether it intersects or encloses any other objects.

This determination is performed by the software every time a user resizes, for example, text object 1 or any object that is either enclosed by it or that intersects it.

NOTE: When a user drags to resize an object that is either enclosed by a complex object or that intersects it the calculations as described above are immediately performed, even if the user drags a distance of one pixel. If the user drags a pixel or two and then drags another pixel or two and simple object on, for each drag which resizes an object as just described, the calculations are performed as described above.

Within the example of FIG. 1 a Villein is any object that is either enclosed or that intersects an object that for this operation has been designated as a Domain. With regards to FIG. 1 and further regarding the current iteration of the Rippling process, namely the resize operation of sub-geometry 3*a* as described above, every other object in FIG. 1 will be a Villein for this iteration of the Rippling process.

In this case identifying the Villeins involves determining the vertical intersection of any object with text object 1. All of the objects shown in FIG. 1 are vertically enclosed by text object 1. They are not all horizontally enclosed. For example, SIMPLE OBJECT A (reference numeral 9) and Text object 2 (reference numeral 13) and text object 3 (reference numeral 17) are not horizontally enclosed. Their external geometry extends laterally beyond the external geometry of text object 1.

The fact that text object 1 is capable of supporting a complex geometry and that other objects are either enclosed by or vertically intersect with text object 1 means that in this process (the current Ripple process as caused by placing a text cursor at 3*b* and hitting the Enter key), the current analysis (this pass) identifies a Domain and all other objects that either vertically intersect text object 1 or that are enclosed by it are Villeins.

After the Domain and villains are identified for this iteration of the Ripple process, every item that is identified as a Villein is taken out of the jurisdiction of text object 1, that is, they are temporarily taken out of the Ensemble. The Ensemble is informed that there has been a geometry change within the ensemble and that is when the simple ripple as described under section above (Basic Ripple) occurs. The software detects that the size of portion 3*a* of text object 1 has changed. A space has been added below this sub-geometry at point 3*b*. At this point the bottom of sub-geometry 3*a* will be overlapping object SIMPLE OBJECT C (4). In response, the software routine determines that all objects below this point will be moved down. The external boundary 19 of text object 1 will change, and the bottom line below portion 8 will move down by a distance that equals the height of the text line that is added at 3*b*. This is the end of this pass.

An important aspect of the previous example is that there are two passes involved. The first pass involves objects moved by the Domain, in this case text object 1 (1). Then there is a further stage to the completion of the ripple which is the simple ripple that extends the bottom boundary of text object 1.

The example of FIG. 1 illustrates the case of a vertical ripple. Horizontal ripples are also possible and operate essentially the same way as vertical ripples.

When an object's geometry is changed by whatever method (for example by resizing the object or by editing text—adding or subtracting one or more lines to the text), then the Villein searches for its enclosing Domain. This can be illustrated in the following manner. If a user places a text cursor somewhere in text object 3 (17) and types additional text with a carriage return (hitting the Enter or Return key) such that another line is added to this text, simple object the text is now two lines. That is, the vertical height of this text object 3 is increased by one line. In this case Text object 3 will not be recognized as a Domain since it has no objects that are vertically enclosed by it. In other words, no objects have been placed within one or more of its internal vertical spaces. For practical purposes, it has no vertical spaces to place an object into.

When a second line is added to Text object 3 this will cause Text object 3 to increase its boundary size by extending downward a distance of one text line. This action causes the Ripple routine to evaluate the Domain of Text object 3, which is Text Object 2 (13). Text Object 2 becomes a Domain to Notify. What the routine looks for is the smallest (height-wise) object having a complex geometry and vertically enclosing Text Object 3 (17). For this example, Text object 3 is vertically enclosed by both text object 1 and text object 2. Of these two, text object 2 has the smallest height, simple object this is recognized as the domain of text object 3. This selection illustrates a key aspect of the recursion process. In other words Text object 3 (17) looks for the vertically smallest (i.e. that with least height) object with a complex geometry that encloses it. In this case it finds Text Object 2 (13). "Encloses it" means that Text Object 3 (17) vertically intersects Text Object 2 where the top of Text Object 3's bounding area lies below the top of Text Object 2's bounding area and Text Object 3's bottom bounding area is above Text Object 2's bottom bounding area.

Regarding the term "complex geometry," this is not limited to text objects. An object that has a complex geometry is an object that has internal layout which may be changed in a non-linear way. In other words, part of the geometry (sub-geometry) of the object can change without changing other parts of the geometry of that same object. Another way of thinking about a complex object, is that a complex object is something that has a property that enables part of its screen appearance to change whereby other parts of its screen appearance remain the same. Thus a complex object could be a group of "glued" or grouped objects. Where this glued group of objects has the property that one or more of the glued objects can have their geometry changed without changing the geometry of other objects in the group.

For instance, if four circles are glued together side by side, and one circle is stretched to increase its width without increasing the width of the other three circles, this would be an example of a glued object with a complex geometry.

Returning to the example of the edit made in Text object 3 (17) to increase its height by the distance of one line height. The Ripple process determines that the relevant Domain is Text Object 2 (13). If no Domain were detected for Text object 3, then process transfers immediately to the Ensemble—the top level geometry. If Text object 2 were not recognized as the relevant Domain, in this example as shown in FIG. 1, the Ripple routine would find Text Object 1, which is the next larger Domain, which would then become the Domain to Notify. If there is no intersection with any complex object, then Text object 3 will inform the Ensemble—the top level—and a simple ripple would occur.

Since it does find an enclosing Domain (Text object 2), the Ripple routine first acts on text object 2. Then Text object 3 delegates any further rippling action to Text object 2 (13). At this point, Text object 3 (17) undergoes no further action.

NOTE: If Text object 3 was typed into a VDACC and it did not vertically intersect any complex objects, then when a second line was added to the text object, it would simply increase its vertical size by the height of one line downward. It would then inform the Ensemble which is contained within a VDACC, that its geometry has changed. Then from that point on the rippling would be strictly simple, using external geometries as described under Section 1 of this document.

Text object 3 interacts directly with Text object 2 and in effect informs it of its geometry change. Once an object has identified its Domain, the software gives the object the ability to interact directly with its Domain. Once the geometry change of Text object 3 has been linked with Text object 2, Text object 2 analyzes this geometry change. Regarding FIG. 1, the simple object software routine recognizes that the geometry change for Text object 3 has increased the vertical height of bounding rectangle around Text object 2 by the height of one line. In response, the size of Text object 2 is changed to accommodate the change in Text object 3. As a result, portions 15 and 16 of Text object 2 will be moved down a distance equal to one line height. The ripple routine detects that the text portion 13 has not moved down, but its two related portions 15 and 16 have moved down. The routine then seeks the Villein objects whose bottom edges were below the top edges of portions 15 and 16 before their downward movement.

At this point the software has generated a change in the complex geometry of Text object 2 (13). The software analyzes this change as though Text object 2 had generated this changed itself (the change being delegated to it from Text object 3—the change in its geometry from adding a vertical line to it by hitting a carriage return.) In this continuing example, the Ripple routine next analyzes Villeins that are affected by the change in text portion 17, and will find simple object D (11). Then this Villein is moved down by the same distance, namely one vertical line space.

The Ripple routine reiteratively analyzes the Ensemble, and deals with the enlarged boundary of Text object 2 that was caused by the vertical expansion of Text object 3. It once again looks for the relevant Domain and finds that Text object 1 vertically encloses it, at which point Text object 1 becomes a Domain to Notify. The process reiterates to once again enlarge the lower vertical extent of text object 1 to accommodate the expansion of text object 2 and the downward movement of portions 15 and 16.

At this point, as far as the main top level Ensemble is concerned Text object 3 and simple object D (11) will have been temporarily removed from consideration. By the end of iteration which is about to start for Text object 1, Text object 2 will have also been removed as well as simple objects E, F and G (12).

Text object 2 reports that its external geometry has changed, namely, its bottom has been moved down by one line height. Text object 1 finds all of its Villeins, which is everything in FIG. 1 except Text object 1. It analyzes which parts of it sub-geometries need to be moved down. In this case, it is sub-geometry (4) and (5). Then these sub-geometries are moved down by the distance of one line height.

These are the only things that are within the geometry of Text object 1 that are below the geometry change in Text object 2. Then Text object 1 will determine that simple objects E, F and G (12) need to be moved down by the same amount.

This recursive behavior continues until all objects have been moved sufficiently to eliminate the need for further Ripple operations. Recursive processing is a significant factor in the invention to determine the relocation of objects and boundaries that is appropriate for changes made by the user or made by other processes carried out by the computer.

The vertical spaces that exist, for instance, in Text object 1 are just counted as space. With a text object it may or may not have text returns in it, but if they are present, then for Allow Ripple, and for most user mouse actions, they are treated as space. In a Blackspace text object, there is just space. This is just screen space. The sub-geometries of a text object, e.g., Text object 1, are the geometries of the visible text fragments that make up that text and the spaces therebetween. These spaces are strings in the code that are stored as part of a text object. Each text object contains a very complex and detailed description of both the content of the text and its formatting. Because vertical (and also object horizontal spaces beyond 2 spaces as defined by the average width of a character being used in a sentence, word, etc.) spaces are not governed by the geometry of the fonts used to create the text, these spaces can be altered on a pixel by pixel basis without having to alter the fonts used to create the text object.

Figure 2:
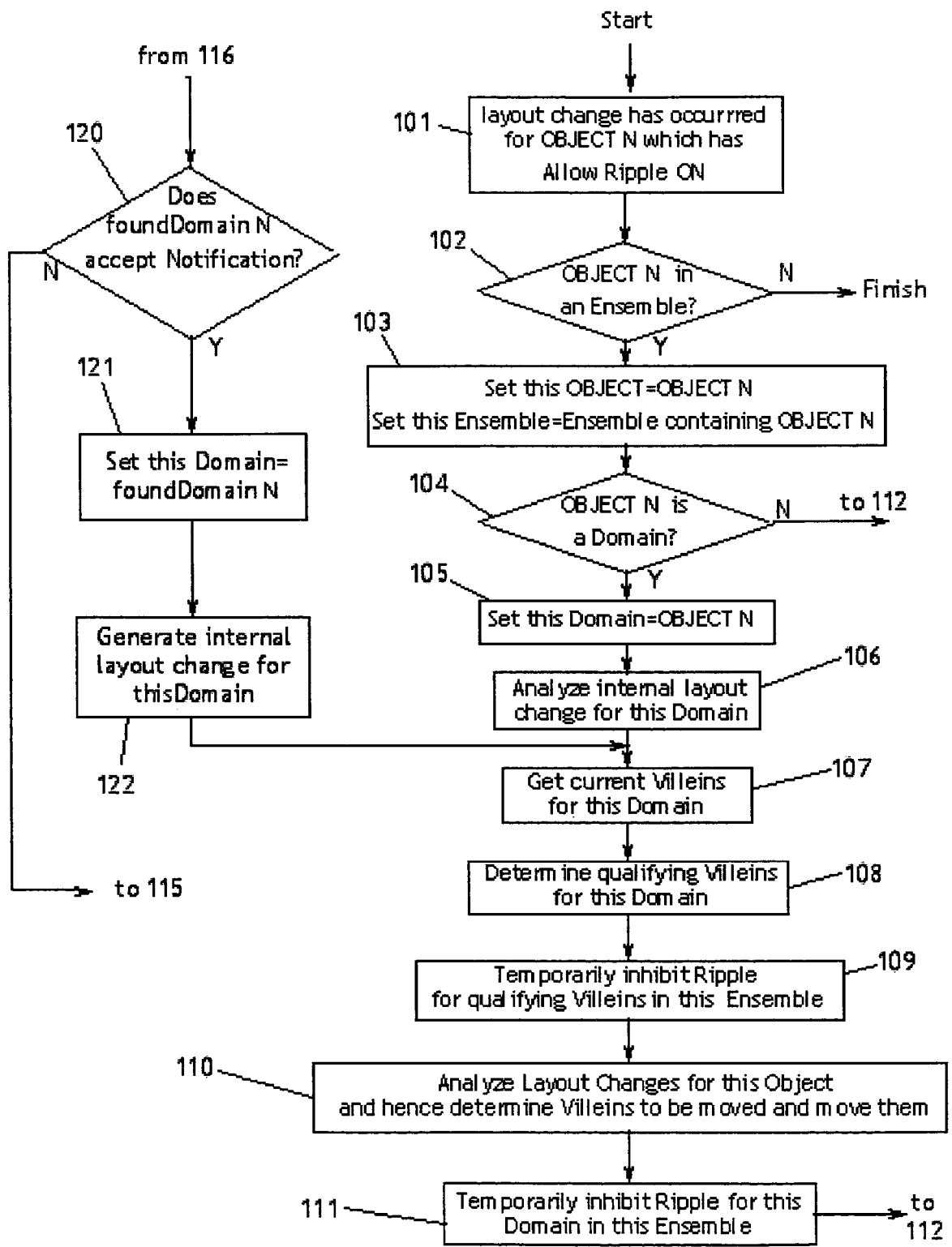
FIGS. 2 and 3 are related portions of a flow chart depicting the operation of the Allow Ripple function for onscreen graphic objects and text objects of the present invention.
Figure 3:
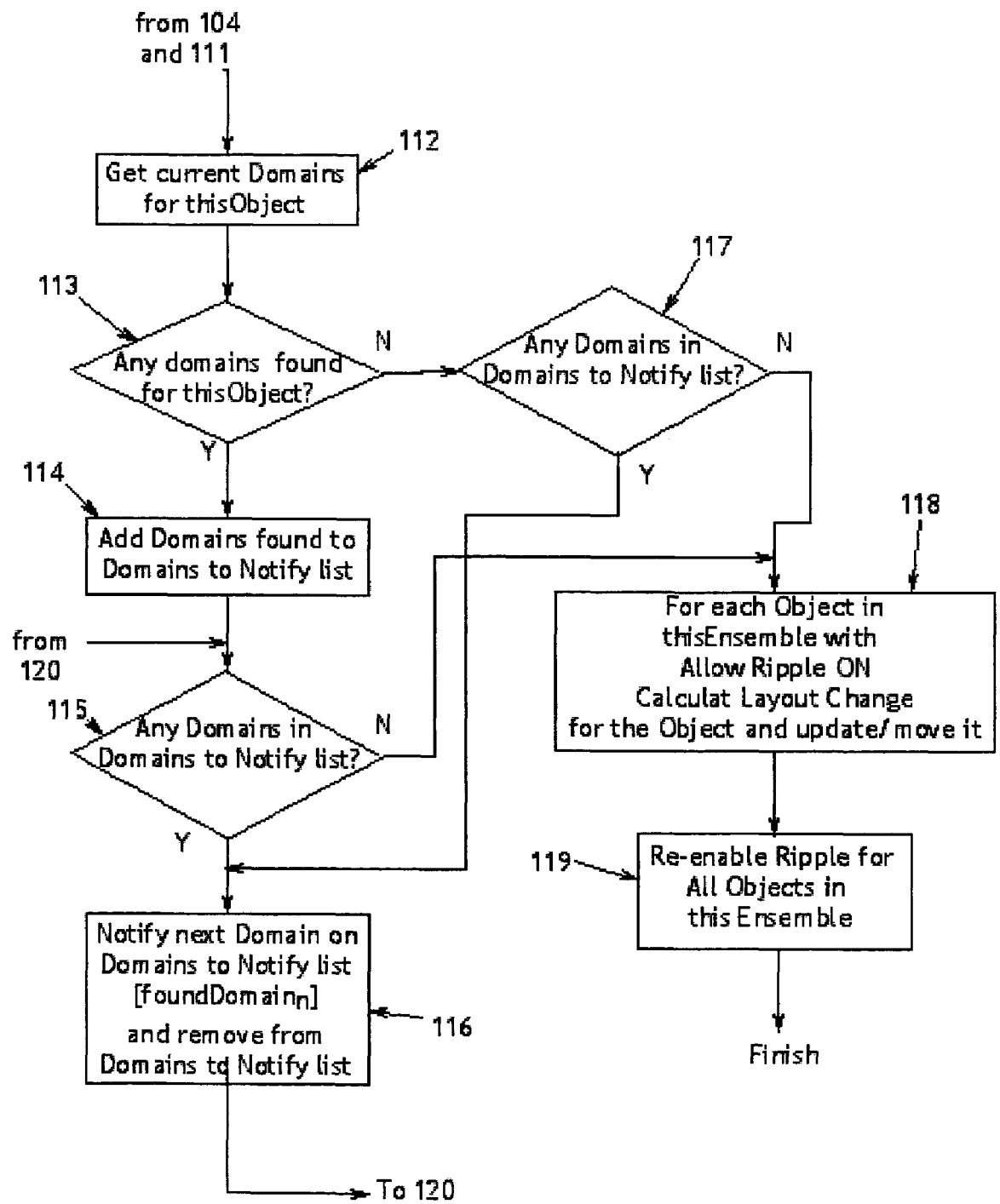

The process described above with reference to FIG. 1 is depicted as a flow chart in FIGS. 2 and 3. Beginning at the Start, at 101 a layout change has occurred for Object N. OBJECT N is any object for which a geometry change has been performed, usually, but not necessarily as a result of user input. At 102, the routine tests if OBJECT N is in an ENSEMBLE. Usually the current screen position of the object will expedite the searching of any extant ENSEMBLES. If yes, the routine at 103 will set the OBJECT and ENSEMBLE for which the overall Ripple process is to be performed, until set otherwise. The routine at 104 determines if Object N is a domain and, if yes, at 105 sets this domain for which the 'Domain-level' processing is to be performed to be Object N, until set otherwise.

The routine at 106 then analyzes the internal layout change for this Domain as instigated by user input or other triggers. At 107 it then gets the current Villein for this Domain. This is usually determined by testing for vertical enclosure of a potential VILLEINS by the simple external geometry of the DOMAIN. Then at 108 the routine determines qualifying candidate VILLEINS according to other individual or esoteric considerations. The routine at 109 then temporarily inhibits the Ripple operation for qualifying Villeins in the Ensemble being processed. Thereafter the routine at 110 analyzes the layout changes for this Object and determines which Villeins should be moved and moves them a calculated distance.

At 111 the Ripple routine temporarily inhibits the Ripple operation for the Domain (OBJECTn) in the Ensemble being processed and proceeds to operation 112 (FIG. 3) to get the current Domain for this Object(OBJECTn). This step also follows step 104 if the OBJECTn is not a Domain. If any Domains are found for OBJECTn in step 113, then these Domains are added to the 'Domains to Notify' list in step 114. At step 115 the routine determines if this list contains any entries and, if simple object, at step 116 it notifies the next Domain on the list and removes it from the Domains to Notify list. It then proceeds to step 120 (FIG. 2) to determine if the found Domain N accepts notification at this time. If yes, it sets this Domain as the found Domain (at step 121) and at step 122 generates internal layout change for this Domain, and then loops back into the routine at step 107 to get the current Villeins for this Domain. This is a recursive loop. At step 120 if the found Domain does not accept notification the routine returns to step 115 and looks at the 'Domains to Notify' list once again.

At step 113 if no Domains are found for this Object the routine proceeds to step 117 and looks for any Domains on the 'Domains to Notify' list. If there are more Domains on the list, the routine returns to step 116 to process the next Domain on the list. If no more Domains are on the list, it proceeds to step 118 and calculates the layout change for each Object remaining in the Ensemble (i.e. those not temporarily removed) that has Allow Ripple set On, and carries out the layout changes. Thereafter Ripple is re-enabled for all Objects in this Ensemble, and the routine is finished.

The Ripple process enables far greater freedom in using text that is possible in prior art word processing or graphics programs. For example, it is possible to have text objects within text objects that are within text objects, and modifications to any one of these text objects can be accommodated easily by the Ripple process. This makes possible the creation of tables of data without requiring the rigid rules and conditions (i.e., pre-selecting the number and size of columns and rows before entering data) of prior art applications, merely by placing text objects side-by-side and using Allow Ripple to generate the optimum spacing and layout for the table. Likewise, mixing graphic objects within a table becomes a trivial task, rather than a layout nightmare, by using the Ripple routine to preserve the spacing of text objects and graphic objects when removing existing Objects, editing their appearance or content, or adding new Objects.

The sub-geometries of the onscreen objects are really objects unto themselves that belong to a larger complex object, and are recognized and processed by the Ripple routine. Judging the geometries dynamically according to an object's current state which includes its sub-geometry and its relationship to one or more objects in the system is an important aspect of the invention.

Text space is an example of this, as are dynamic wire frame objects; making a wire frame object touch transparent within its defined perimeter (the space inside its perimeter line which constitutes the wire frame) only when it needs to be. For example, only when an object is underneath a wire frame object. Touch transparency is decided not as a hard and fast rule. Rather, it depends entirely where is the recognized object and the location and type of the objects under it and where a user mouse-clicks within the perimeter of the wire frame object.

Regarding the presentation of text in Blackspace, and its relationship to the Text Space function and the Staircase formatting object, the following information is pertinent. The basic structure of a text object is:

1) a document, which has a defined position and width, and keeps a list of paragraphs;
2) A paragraph, which manages the text between hard line breaks (i.e., when the user presses Enter or Return). It maintains a position and geometry relative to the document, data which determines how the text it contains should be laid out, and a list of lines;
3) A line, which is simply a horizontal row of alphanumeric characters and spaces. It has a position relative to the paragraph in which it resides, and data about which characters it should draw.

4) Formatting, which is the process which calculates the layout of text.

There are several factors that determine the position of a paragraph. By default it will be positioned directly below the previous paragraph, if there is one, horizontally at the left margin of the document, and with a wrap width that is the same as the document. The vertical position of a paragraph may be altered, either by using the Text Space function or, if it is formatted by a staircase formatting object, by altering the staircase object. It has a top margin, which is alterable by Text Space, a vertical outline or list spacing, if a staircase formatting object has been applied, and its ultimate position relative to the paragraph above it is affected by all these factors. The Blackspace software is written to ensure that it is not possible to make the text in a paragraph overlap the text in the paragraph above it, so it is possible to move a paragraph closer to the one above it using Text Space. If paragraphs threaten to overlap during a Text Space move, the top margin is altered so that the overlap is prevented. The staircase formatting object is fully described in copending U.S. patent application Ser. No. 10/635,704, filed Aug. 5, 2003 and incorporated herein by reference.

Similarly, the horizontal position may be altered, using the VDACC margin arrows to alter the left and right margins and, if it is controlled by a staircase formatting object, by changes in the staircase size and shape. The horizontal positioning is not limited like the vertical spacing; the user can alter it so that a paragraph moves to the left of a document if desired. The right margin is simply one value which determines the distance from the right side of the document where the paragraphs text wraps to the next line.

By default, a line has the same horizontal position as its paragraph, and vertical position is directly below the line above it. The vertical spacing may be altered on a per-paragraph basis through font size selection in a window or Info Canvas. The vertical and horizontal spacing of a line or paragraph or document may be altered by use of the Text Space function. The document stores this data, since the lines are generated dynamically by the formatting algorithm.

If a paragraph is a formatted list item, it has a header, although the header is not considered part of the paragraph's text. Thus in Text Space mode, to alter the horizontal spacing of the first line of a list item, the user moves the mouse over the first character after the list header, and the list header moves with the rest of the line. There is also a special case indent which may be applied in the staircase formatting object default spacing mode, in which the list header is drawn at the same horizontal position as the other lines, meaning that the recognized beginning of the line moves to the right. This indent is applied additionally to any changes to the horizontal spacing the user may make to that line.

Figure 8A:
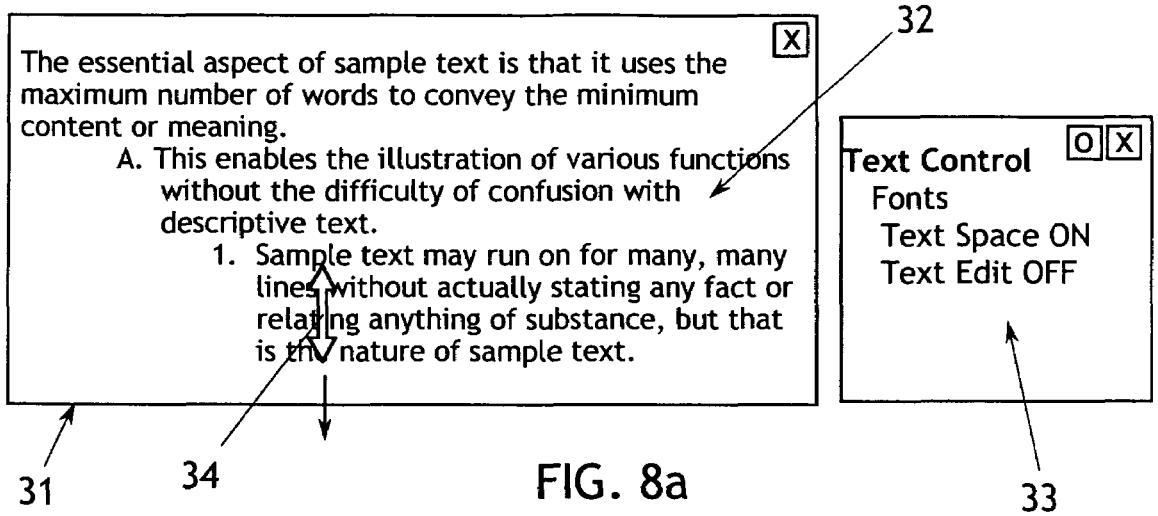
FIGS. 8a-8c depict various aspects of the Text Space mode of the present invention.
Figure 8B:
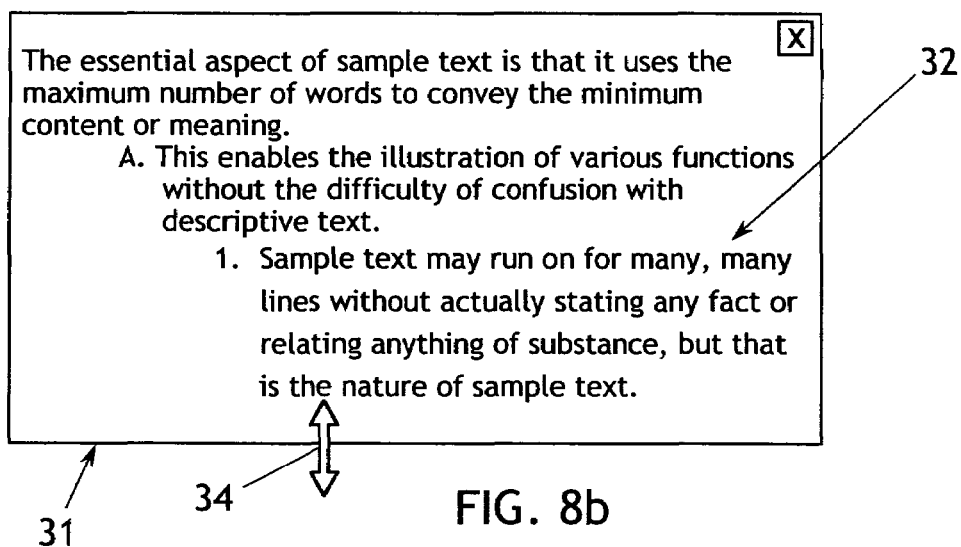
Figure 8C:
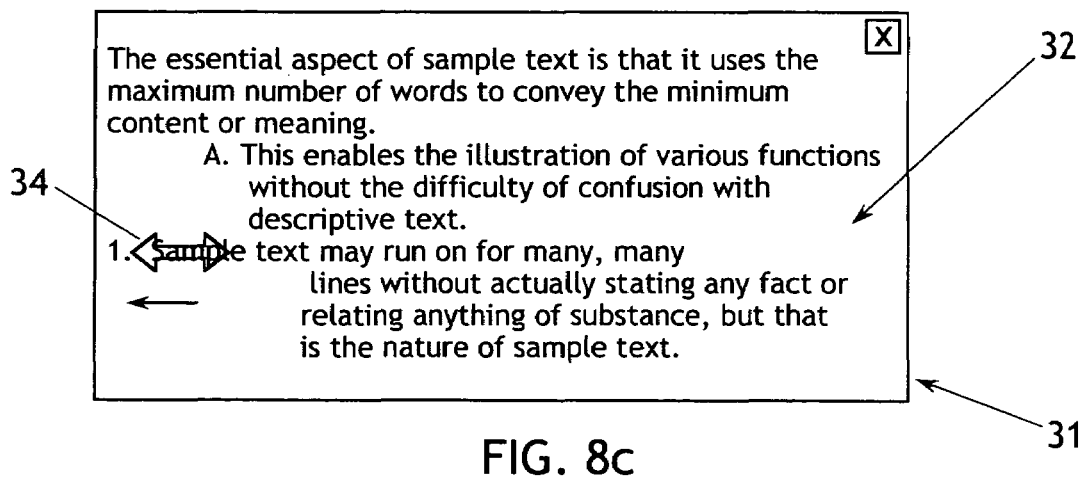

With reference to FIG. 8a, a VDACC 31 may contain a text object 32 that is formatted in an outline or list style. By right clicking on the object 32, the user calls forth an Info Canvas 33 that relates to text control. The user may click on Text Space ON to invoke this function, as explained above. Thereafter, floating the cursor over the text object 32 causes the cursor to change into a double ended arrow 34. In this condition the text content cannot be edited in any way, but the text spacing may be altered easily. For example, by clicking and dragging the arrow 34 downwardly as shown by the adjacent direction arrow, the underlying lines of text may be dragged downwardly to a new, wider spacing, as shown in FIG. 8b. In the same vein, the arrow 34 may be dragged laterally as shown in FIG. 8c to drag an individual line leftward (or rightward, at the user's discretion). Thus Text Space enables quick movement and custom spacing of text lines and paragraphs without regard to rigid rules of text line and formats as are known in the prior art. When Text Space is turned off, Text Edit is turned on to enable insertion, removal, correction, and other editing functions to be carried out within the object 32.

Figure 6:
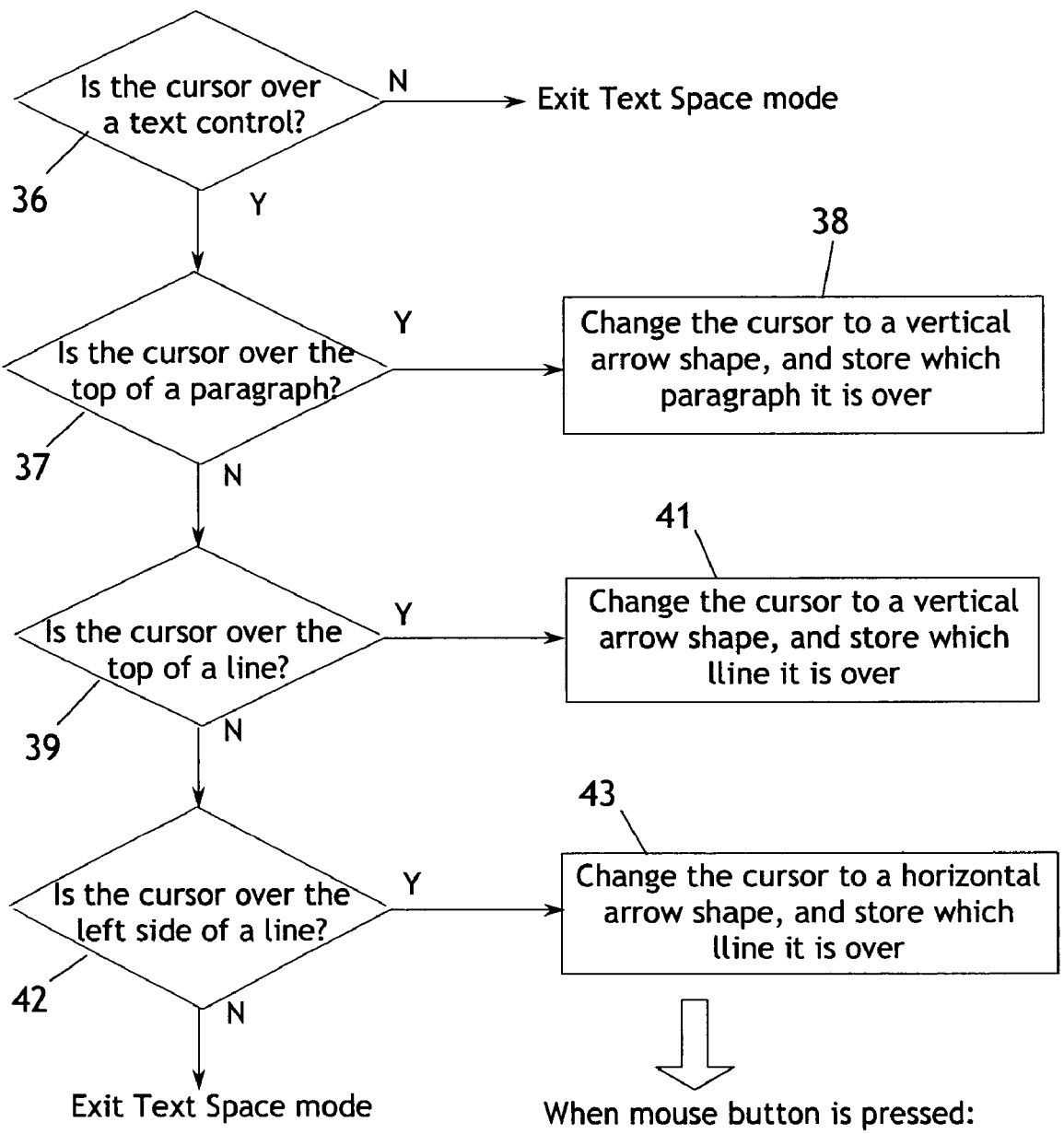
FIG. 6 is a flow chart depicting the operation of the Text Spacing function of the present invention as it relates to mouse cursor position.

The flow chart for correlating mouse movement during Text Space operations in shown in FIG. 6. The routine first determines at step 36 if the cursor is over a text control. If not, the routine exits the Text Space mode. If yes, it goes to step 37 and determines if the cursor is over the top of a paragraph. If so, it goes to step 38 and changes the cursor to a vertical arrow shape and stores which paragraph the arrow overlies. If not, the routine goes to step 39 and determines if the cursor is floating over the top of a line. If yes, it goes to step 41 and changes the cursor to a vertical arrow and stores the identity of the line. If not, the routine goes to step 42 and determines that if the cursor is over the left side of a line it will change the cursor to a horizontal arrow (step 43) and store the identity of the line. Otherwise it will exit the Text Space mode. Thereafter if the routine remains in Text Space mode and its arrow is present, when the mouse button is pressed and moved a new text spacing is initiated.

Figure 7:
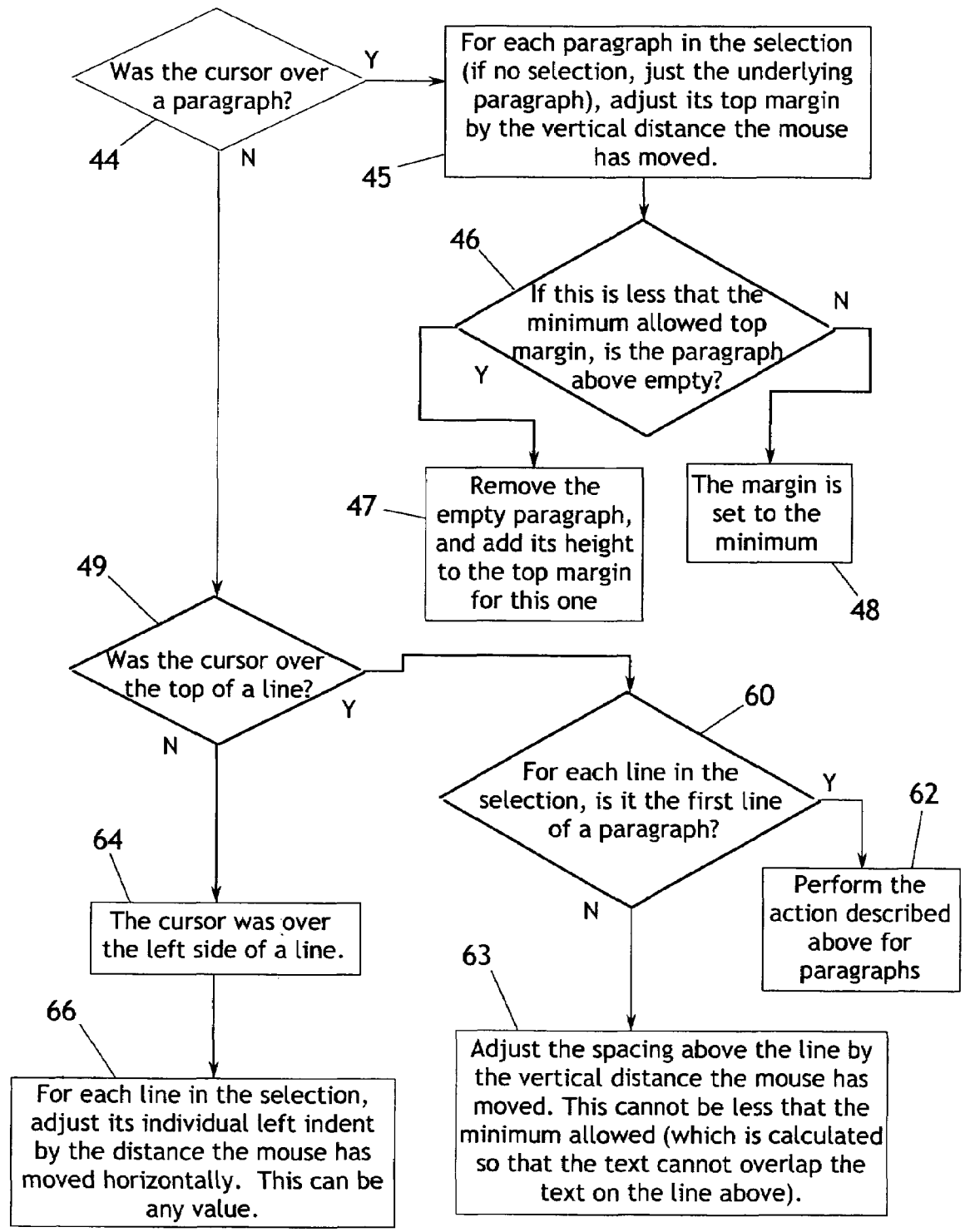
FIG. 7 is a flow chart depicting the operation of the Text Spacing function of the present invention as it relates to mouse cursor movement.

With reference to FIG. 7, if the cursor is over a paragraph when the mouse is moved in Text Space mode, for the underlying paragraph (or a selection of multiple paragraphs) adjust the top margin by the vertical distance the mouse is moved (step 45). In step 46, if the movement results in less that the minimum allowed top margin, and if the paragraph above is empty, the go to step 47 and remove the empty paragraph and add its height to the top margin for the moving paragraph. If not, go to step 48 and set the top margin to the minimum. Returning to step 44, if the cursor is not over a paragraph, but it is over the top of a line (step 49) go to step 60. For each line in the selection, if it is the first line of a paragraph, go to step 62 and perform the actions of steps 45-48. If it is not the first line of a paragraph, adjust the spacing above the line by the vertical distance the mouse has moved, within the minimum limit to prevent overlap with the line above (step 63). If the result at step 49 is no, then the cursor is over the left side of a line and, at step 66, for each line in the selection adjust its individual left indent by the distance the mouse has moved horizontally, which can be any value.

Figure 4:
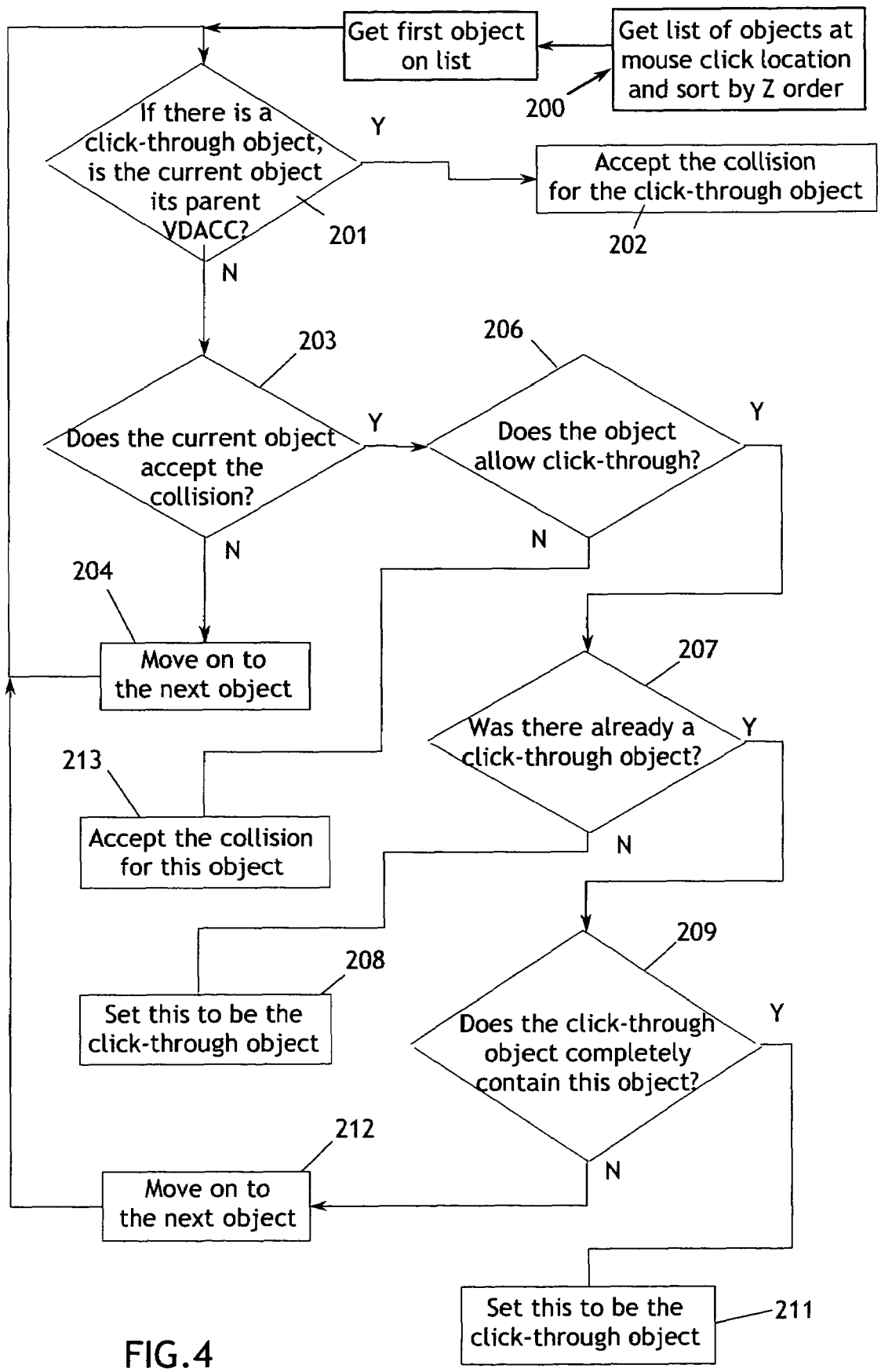
FIG. 4 is a flow chart depicting the operation of the Touch Transparency function of the present invention.

With regard to FIG. 4, the touch transparency of an onscreen object with regard to a mouse click or the like is determined as described in the flow chart. At step 200 the software, after receiving a mouse click at a screen location, gets a list of all objects that have an extent that coincides (collides) with the click location, sorts the list by Z order (topmost to bottommost of the overlying objects at the location) and then gets the first object on the list. That is, the routine goes through the list in order, and each object has a test by which it can accept or reject the collision. An object that accepts the collision is designated to respond to the mouse click, whereas an object that does not accept the collision or which passes through the click does not respond to the mouse click. At step 201, the routine determines if the current object is a click-through object in a parent VDACC. If so, it accepts the collision for the click-through object at step 202. If not, it goes to step 203 and determines if the current object accepts the collision. If not, it goes to step 204 and moves on to the next object in the list. If the result at step 203 is Yes, it goes to step 206 and determines if the object allows click-through. If not, it accepts the collision for the current object at step 213. If the object allows click through at step 206, it then determines at step 207 if there is not already a click-through object and at 208 sets the current object to be the click-through object. If a click-through object already exists, it determines at step 209 if the previous click-through object completely contains the current object and if yes it sets the current object to be the click-through object. If No at 209, the routine moves on to the next object on the list. Thus the routine goes through the list until it finds an object at the click location that is capable of receiving and responding to the click. If the end of the list is reached and there is a click-through object and no other object has been found to accept the click, the click-through object receives the click. Otherwise it is determined that the click has occurred in empty blackspace.

Figure 5:
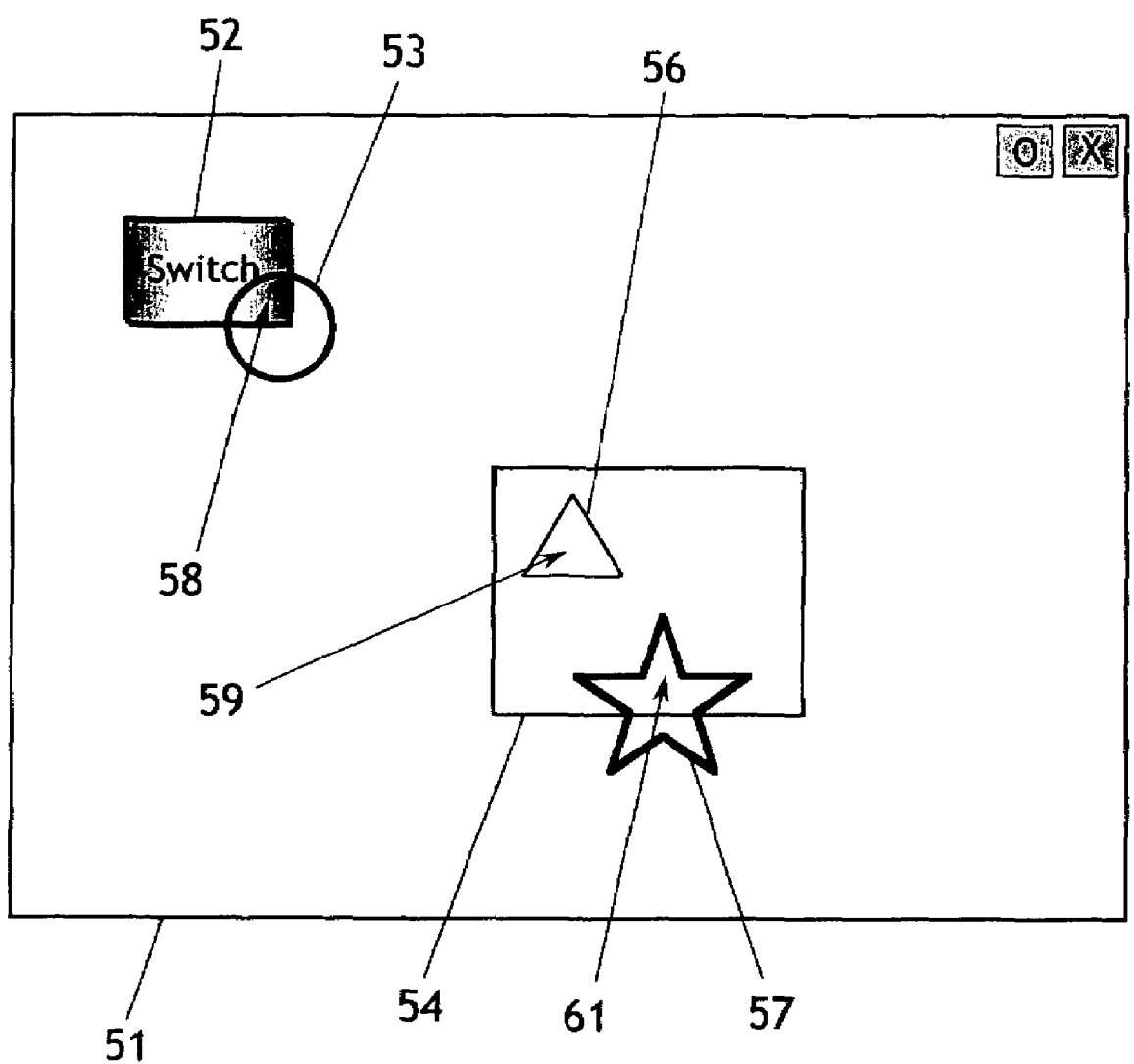
FIG. 5 is a layout depicting graphic objects on a display screen and the use of the Touch Transparency function of the present invention.

FIG. 5 provides a display layout to illustrate the operation of the routine of FIG. 4. A VDACC 51 contains a switch 52 and a circle 53 overlying the switch. A rectangle 54 is also displayed not intersecting objects 52 or 53. Triangle 56 is disposed within the rectangle 54, and star 57 is partially within the rectangle 54. If a click is received at 58 within the circle 53 and over the switch 54, the top object is the circle. It accepts the mouse click but allows click-through, since the user has clicked in the transparent area of the circle. The routing then analyzes the underlying switch, which also accepts the mouse click but does not allow click-through. Thus the switch 52 receives the mouse click.

For a mouse click at 59, the uppermost object is the rectangle 54. It accepts a mouse click and allows click-through, since it was clicked where it is transparent. The triangle 56 is then analyzed: it accepts the click, and also allows click-through, since it is transparent, so it becomes the click-through object (step 211). The next object below on the processing list is the VDACC 51. Because it is the parent VDACC of the current click-through object (the triangle 56), the decision at step 201 is Yes and at step 202 the collision is accepted for the current click-through object, which is the triangle 56.

For a mouse click at 61, the uppermost object is once again the rectangle 54. It accepts the mouse click and allows click-through. Next on the list is the star 57. It accepts the mouse click and allows click-through. However, a click-through object has already been identified (56), and it does not fully contain the star 57 (step 209), so the rectangle 54 remains the click-through object. The next object below on the processing list is the VDACC 51. Because it is the parent VDACC of the current click-through object (the rectangle 54), the decision at step 201 is Yes and at step 202 the collision is accepted for the current click-through object, which is the rectangle 54.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In an electronic device having a processor and a display depicting a plurality of onscreen objects, a method for repositioning text portions, including the steps of:

floating a mouse cursor over a text object before any mouse click is placed in the text object, and changing the floating mouse cursor into a predetermined cursor shape that indicates a text repositioning function is being carried out;

determining the position of the mouse cursor such that:

if the floating cursor is over a paragraph, the paragraph is moved the same amount as the cursor when a click-and-drag movement of the cursor is delivered to the paragraph;

if the floating cursor is over the top of a line, the line is moved the same amount as the cursor when a click-and-drag movement of the cursor is delivered to the line;

if the floating cursor is over the left side of a line, the individual left indent of said line is adjusted the same amount as the cursor when a click-and-drag movement of the cursor is delivered to the left side of the line.

2. In the method for repositioning text portions by click-and drag inputs of claim 1, further including the step that if the floating cursor is over a paragraph, first change the floating cursor into a vertical arrow shape and store which paragraph it is over.

3. In the method for repositioning text portions by click-and drag inputs of claim 1, further including the step that if the floating cursor is over the top of a line, first change the floating cursor into a vertical arrow shape and store which line it is over.

4. In the method for repositioning text portions by click-and drag inputs of claim 1, further including the step that if the floating cursor is over the left side of a line, first change the floating cursor into a horizontal arrow shape and store which line it is over.

5. In the method for repositioning text portions by click-and drag inputs of claim 1, further including the initial step of turning off any text edit function to enable said text repositioning function.

\* \* \* \* \*